United States Patent [19]

Lam et al.

[11] Patent Number: 5,253,533
[45] Date of Patent: Oct. 19, 1993

[54] MASS FLOW METER

[75] Inventors: Son Lam, Bad Urach; Herbert Christ, Reutlingen; Rolf Heisig, Reutlingen-Altenburg, all of Fed. Rep. of Germany

[73] Assignee: Krohne Messtechnik MASSAMETRON GmbH & Co. KG, Fed. Rep. of Germany

[21] Appl. No.: 736,400

[22] Filed: Jul. 26, 1991

[30] Foreign Application Priority Data

Jul. 28, 1990 [DE] Fed. Rep. of Germany ....... 4023989

[51] Int. Cl.⁵ .................. G01F 1/84; G01N 11/00
[52] U.S. Cl. ................. 73/861.37; 73/32 A; 73/54.41
[58] Field of Search ........... 73/861.37, 861.38, 32 A, 73/54.01, 54.02, 54.41

[56] References Cited

U.S. PATENT DOCUMENTS

| | | | |
|---|---|---|---|
| 3,276,257 | 10/1966 | Roth | 73/861.38 |
| 3,329,019 | 4/1967 | Sipin | 73/861.38 |
| 3,444,723 | 5/1969 | Wakefield | 73/32 A |
| 3,485,098 | 12/1969 | Sipin | 73/861.38 |
| 3,728,893 | 4/1973 | Janssen | 73/32 A |
| 3,927,565 | 12/1975 | Pavlin | 73/861.37 |
| 4,187,721 | 2/1980 | Smith . | |
| 4,711,132 | 12/1987 | Dahlin . | |
| 4,803,867 | 2/1989 | Dahlin . | |
| 4,876,898 | 10/1989 | Cage et al. . | |
| 4,972,724 | 11/1990 | Ricken | 73/861.37 |

FOREIGN PATENT DOCUMENTS

| | | |
|---|---|---|
| 0272758 | 12/1987 | European Pat. Off. . |
| 8904463 | 11/1988 | PCT Int'l Appl. . |
| 2001759 | 7/1978 | United Kingdom . |
| 2071321 | 10/1980 | United Kingdom . |

*Primary Examiner*—Herbert Goldstein
*Attorney, Agent, or Firm*—Cesari and McKenna

[57] ABSTRACT

A mass flow meter for flow media which works primarily on the Coriolis Principle has a pipe inlet, a straight pipe carrying the flow medium, a pipe outlet, an oscillation generator operating on the pipe and two transducers detecting preferably Coriolis forces and/or Coriolis oscillations affecting Coriolis forces. The flow meter has a relatively low natural frequency at a certain layout length or a relatively short layout length at a certain natural frequency, and in this way, the oscillation generator engages the pipe via an articulated arm so that the conduit is excited to torsional and bending vibrations.

8 Claims, 2 Drawing Sheets

MASS FLOW METER

The invention concerns a mass flow meter for flow media that works primarily on the Coriolis Principle, with a pipe inlet with at least on basically straight pipe carrying the flow medium and a pipe outlet with at least one oscillation generator exerting an effect on the pipe, and at least one transducer that preferably detects Coriolis forces and/or Coriolis vibrations affecting Coriolis forces.

BACKGROUND OF THE INVENTION

Various embodiments of mass flow meters for flow media that work on the Coriolis Principle are known (see, for example, German Disclosure Documents 26 29 833, 28 22 087, 28 33 037, 29 38 498, 30 07 361, 33 29 544, 34 43 234, 35 03 841, 35 05 166, 35 26 297, 37 07 777, 39 16 285 and 40 16 907, European Patent Disclosure Documents 0 083 144, 0 109218, 0 119 638, 0 185 709, 0 196 150, 0 210 308, 0 212 782, 0 235 274, 0 239 679, 0 243 468, 0 244 692, 0 250 706, 0 271 605, 0 275 367 and 0 282 552, as well as U.S. Pat. Nos. 4,491,009, 4,628,744 and 4,666,421) and are increasingly being applied in practice.

Mass flow meters for flow media that work on the Coriolis Principle are basically divided into those whose pipes are designed to be straight, and those whose pipes are designed to be single or multi-curved, and a pipe loop. Another differentiation is made between those in question with only one pipe and those with two; in designs with two, they may be fluidally in series or in parallel. All these embodiments have advantages and disadvantages.

The mass flow meters in which the pipe/s is/are designed to be straight are simple in mechanical design and consequently can be produced at relatively low cost and the inner surfaces of the pipes are easy to process, for example, to polish. They also have low pressure losses. The disadvantage is that they have a relatively high natural frequency at a certain layout length. The embodiments of mass flow meters in which the pipe/s is/are designed to be curved have disadvantages where those with a straight pipe or pipes have advantages. But their advantage is that they have a relatively low natural frequency at certain layout lengths.

SUMMARY OF THE INVENTION

The task of the invention is to provide a mass flow meter with at least one basically straight pipe that has relatively low natural frequency at a certain layout length or that can be built with a relatively short layout length at a certain natural frequency.

The mass flow meter of the invention, which solves the task that has been introduced and presented, is now first and foremost characterized by the fact that the oscillation generator engages the pipe via an articulated arm. While in known mass flow meters with at least one basically straight pipe, the oscillation generator acts directly on the pipe, thus exciting the pipe—at least almost exclusively—to bending vibrations, the measures in the invention whereby the oscillation generator engages the pipe via an articulated arm cause the pipe to be excited to torsional vibrations and bending vibrations. The main thing is that the natural frequency related to the torsional vibrations is substantially smaller than the natural frequency related to the bending vibrations and can be influenced, without influencing the length, mass and/or stiffness of the pipe, namely via the articulated arm, i.e., via the mass of the articulated arm and via the distance between the longitudinal axis of the pipe and the mass of the articulated arm.

Mass flow meters of the type in question generally operate in resonance. On the one hand, this has the advantage that the excitation can be produced with a minimum expenditure of energy. On the other hand, operating in resonance is a precondition for determining the density of the flow medium with this type of mass flow meter. Actually, mass flow meters of the type in question are used both for determining the flow of a mass and for determining the density of the flow media. That is the reason that at the beginning it was called a "mass flow meter for flow media that works primarily on the Coriolis Principle" and "with at least one transducer preferably detecting Coriolis forces and/or Coriolis vibrations affecting Coriolis forces." (Because when the density of the flow medium is determined with the mass flow meter in question, the mass flow meter naturally is not working on the Coriolis Principle.)

Besides the advantage, already mentioned, of the mass flow meter of the invention—low natural frequency despite short layout length—the oscillation generator manages to act on the pipe via an articulated arm, and the pipe is therefore—and primarily—excited to torsional vibrations; thus with the mass flow meter of the invention, the viscosity of the flow medium can also be determined. Thus, first of all, we have a meter which a) the mass flow of the flow medium can be determined via Coriolis forces or Coriolis oscillations, resulting from the bending vibration, b) the density of the flow medium can be determined via the natural frequency of the bending vibration or alternatively to b)

c) the viscosity of the flow medium can be determined via the natural frequency of the torsional vibration (or via the expenditure of energy required for the torsional vibration).

Taken individually, there are now many possibilities for building and developing the mass flow meter of the invention. In this connection, consider the description of a preferred embodiment, in connection with the drawings.

BRIEF DESCRIPTION OF THE DRAWINGS

For a fuller understanding of the nature and objects of the invention, reference should be made to the following description, taken in connection with the accompanying drawings, in which.

DESCRIPTION OF THE PREFERRED EMBODIMENTS

Figure 1:
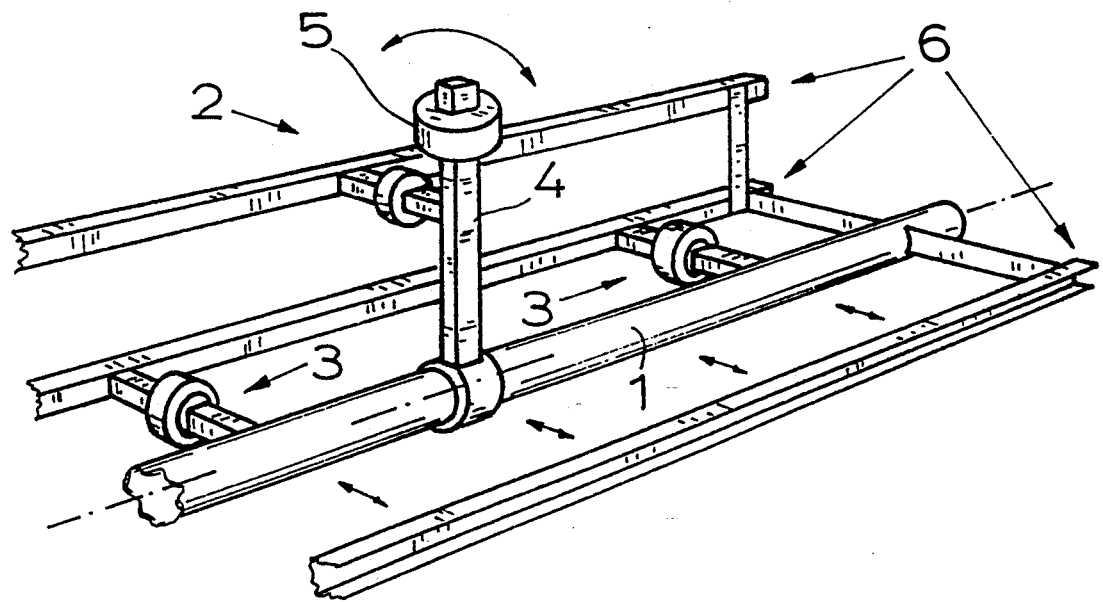
FIG. 1 is a fragmentary perspective view of a measurement system of a mass flow meter that works on the Coriolis Principle according to the invention.
Figure 2:
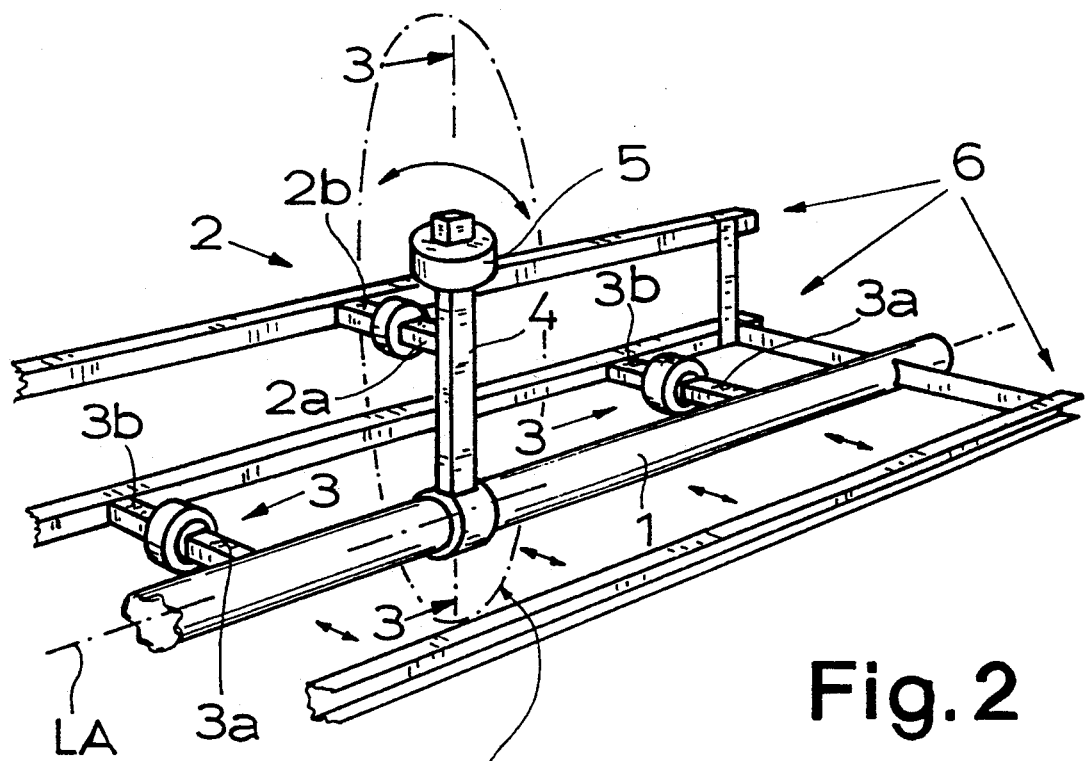
FIG. 2 is a similar view illustrating the operation of the FIG. 1 system.
Figure 3:
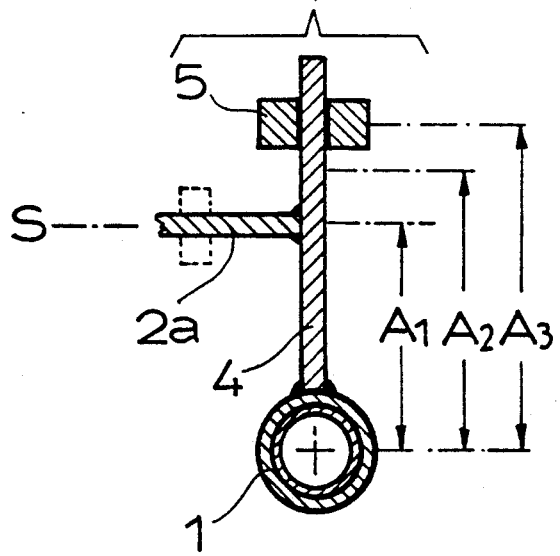
FIG. 3 is a sectional view taken along line 3—3 of FIG. 2.

FIGS. 1 to 3 show only the actual measurement system of a mass flow meter for flow media that works on the Coriolis Principle. Along with it are a straight pipe 1 having an inlet and an outlet and carrying the flow medium, an oscillation generator 2 engaging the pipe 1 and a transducer 3.

As the figures show, although the oscillation generator 2 does not engage the pipe 1 directly, it does engage the pipe 1 via an articulated arm 4. While in the known mass flow meters on which the invention is based, the oscillation generator excites the pipe—at least almost exclusively—to bending vibrations, the mass flow meter in the invention acts on the oscillation generator 2 via an articulated arm 4 so that the pipe 1 is excited to torsional vibrations and bending vibrations. The natural frequency related to the torsional vibrations is basically lower than the natural frequency related to the bending vibrations and can be influenced without influencing the length, the mass and/or the rigidity of the pipe 1.

Now, with reference to FIGS. 2 and 3, an embodiment of the mass flow meter of the invention is conceivable in which the distance A between the longitudinal axis LA of the pipe 1 and the contact point S of the oscillation generator 2 on the articulated arm 4 can be adjusted; but this is not shown in detail in the figures.

In the mass flow meter of the invention, the natural frequency related to the torsional vibrations can be influenced by the articulated arm 4, i.e., via the mass of the articulated arm 4 and by the distance $A_2$ between the longitudinal axis LA of the pipe 1 and the mass of the articulated arm 4 which have an effect on the natural frequency. This can be done in the embodiment shown by giving the articulated arm 4 a natural frequency control mass 5 that is adjustable in relation to the distance $A_3$ to the longitudinal axis LA of the pipe 1.

For the mass flow meter of the invention shown in the figures, as well as for the known mass flow meters on which the invention is based, it is true that both the oscillation generator 2 and the transducer 3 each consist of a moving part $2a$ or $3a$ and a stationary part $2b$ or $3b$. The figures show embodiments of the mass flow meter of the invention in which the moving part $3a$ of the transducer 3 is connected directly to the pipe 1. But it is also conceivable to have a form of embodiment in which the moving part of the transducer is likewise connected to the pipe via a carrier arm, in the same way that the oscillation generator 2 engages the pipe 1 via an articulated arm 4. This can be used particularly for thermal uncoupling between the pipe 1 an the moving part $3a$ of the transducer 3.

Moreover, in the mass flow meter of the invention, a series of measures can be taken that are described in German Disclosure Documents 39 16 285 and 40 18 907, but not shown in the figures. Hence, the contents of German Disclosure Documents 39 16 285 (corresponding to U.S. Pat. No. 5,129,263) and 40 16 907 are incorporated herein by reference for the description of the mass flow meter of the invention.

Finally, the figures show one preferred embodiment of the mass flow meter of the invention that has a torsion-proof, rigid carrier system 6, with the stationary part $2b$ of the oscillation generator 2 and the stationary part $3b$ of the transducer 3 connected to the carrier system 6.

The figures show the theory behind the invention in one form or embodiment of a mass flow meter that has only one pipe 1. The theory behind the invention can, however, be applied to mass flow meters that have two pipes, wherein both pipes can be fluidally in series or in parallel.

The figures show that the articulated arm 4 is excited around the longitudinal axis LA of the pipe 1. But it is also conceivable to have another embodiment in which the articulated arm is excited to vibrations in the plane in which the longitudinal axis of the pipe is found. Then, the articulated arm can be on both sides of the pipe, and natural frequency control masses can be provided on each side of the pipe.

In addition, the double-sided articulated arm can be engaged on one side to the oscillation generator, and the natural frequency control masses can be provided on the other.

The mass flow meter of the invention provides, for the first time, a meter with which the mass flow of the flow medium can be determined by Coriolis forces or Coriolis oscillations resulting from the bending vibration, the density by the natural frequency of the bending vibration and the viscosity by the natural frequency of the torsional vibration (or by the expenditure of energy required for the torsional vibration).

We claim:

1. A Coriolis-type meter for flow media including
    a basically straight pipe having inlet and outlet ends and a longitudinal centerline;
    means for supporting the ends of the pipe;
    an arm connected at one end to the pipe intermediate the ends of the pipe;
    at least one oscillation generator contacting said arm at a selected contact point thereon spaced from said one end of the arm for moving said arm so as to simultaneously torsionally oscillate said pipe about said centerline and bend said pipe in an oscillating manner, and
    at least one transducer responsive to movements of said pipe between the ends thereof to produce electrical signals indicative of those movements.

2. The meter according to claim 1 wherein the contact of said oscillator generator to said arm is adjustable along the arm so as to vary the distance between said axis and said contact point.

3. The meter according to claim 1 or 2 and further including a natural frequency control mass adjustably positioned along said arm away from the pipe axis.

4. The meter according to claims 1 or 2 and further including a carrier arm having one end contacting the pipe and another end contacting the transducer for coupling the movements of the pipe to the transducer.

5. The meter according the claims 1 or 2 wherein
    the support means include a carrier system which prevents lateral displacement and rotation about said axis of the pipe ends, and
    the oscillation generator and the transducer are supported by the carrier system.

6. A Coriolis-type meter for flow media comprising a basically straight pipe having opposite ends and a longitudinal centerline;
    means for supporting the ends of the pipe;
    exciting means engaging said pipe intermediate the ends thereof for applying an oscillating force to said pipe which simultaneously torsionally oscillates said pipe about said centerline and bends said pipe in an oscillating manner, and
    transducer means contacting the pipe intermediate the ends of the pipe and being responsive to the movements of the pipe to produce electrical signals indicative of those movements.

7. The meter defined in claim 6 wherein the exciting means include means for adjusting the torque applied to said pipe.

8. The meter defined in claim 6 and further including means for adjusting the natural frequency of the torsional oscillation of said pipe.

* * * * *